June 23, 1970    J. G. MAGA    3,517,160
ADHESIVE ACTIVATING MACHINE FOR SHOES
Filed Sept. 6, 1968    3 Sheets-Sheet 1
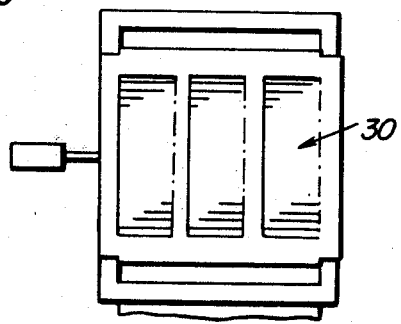
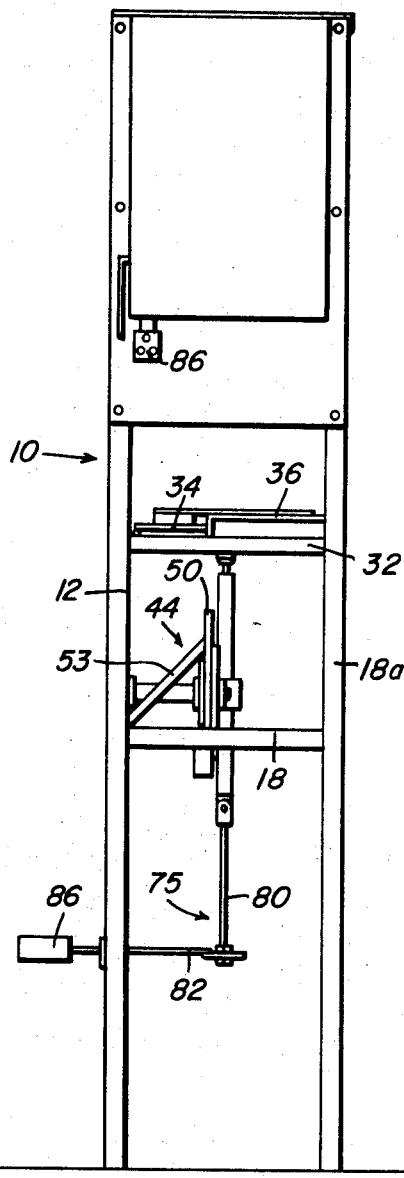
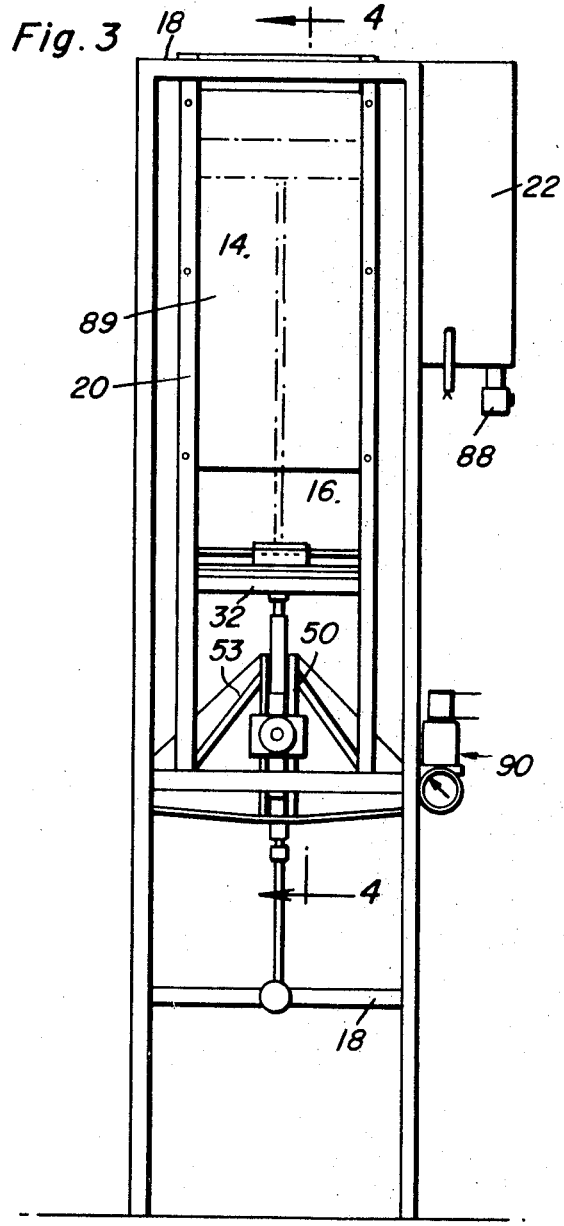
Joseph G. Maga
INVENTOR.

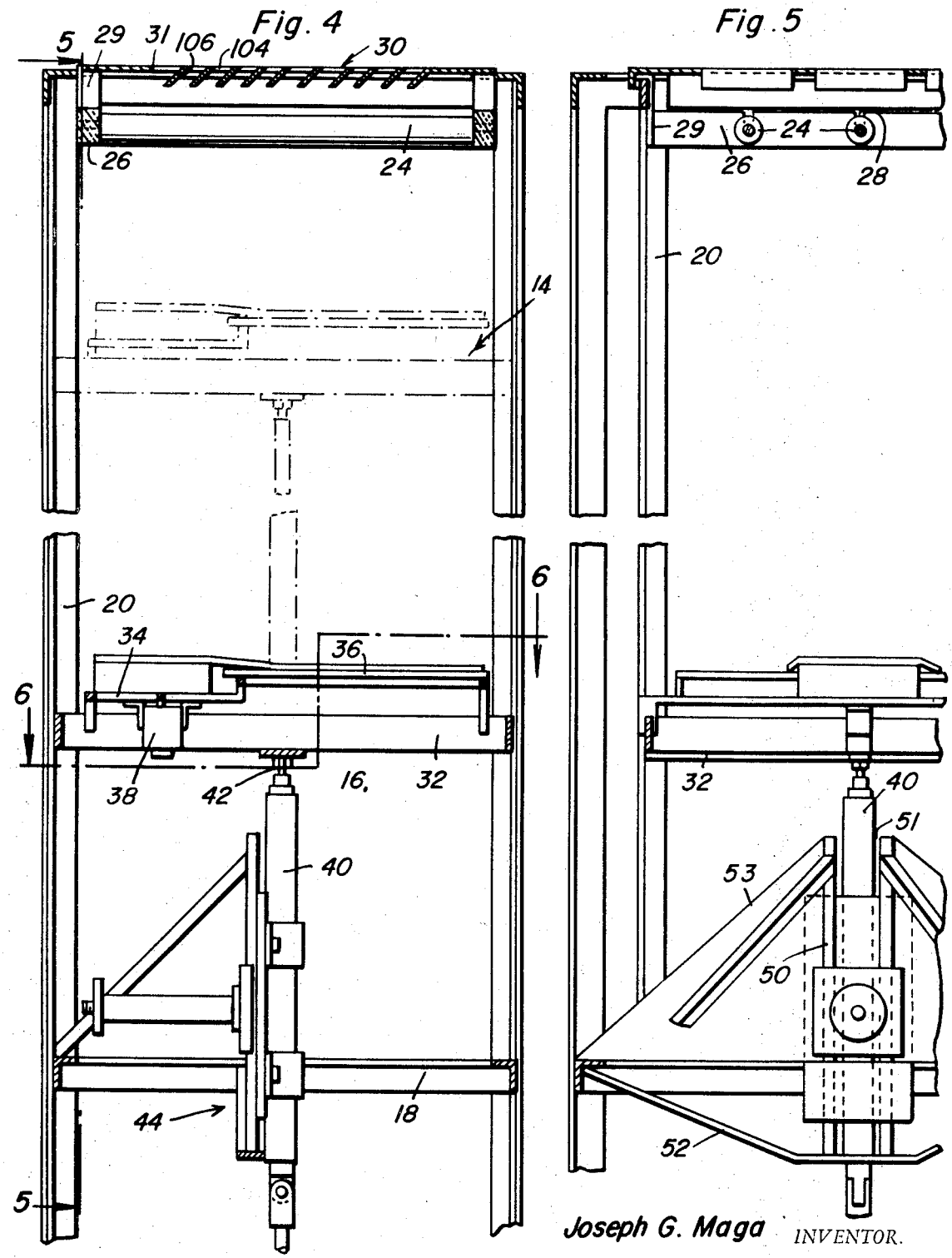

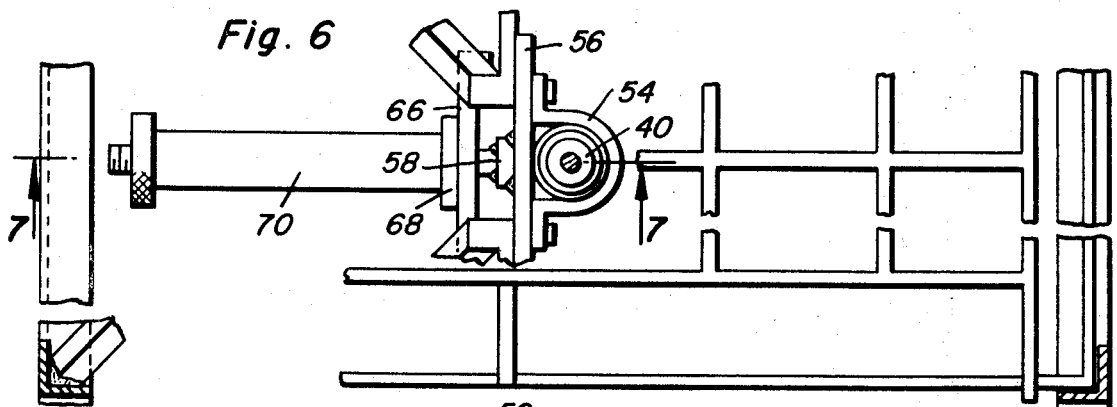
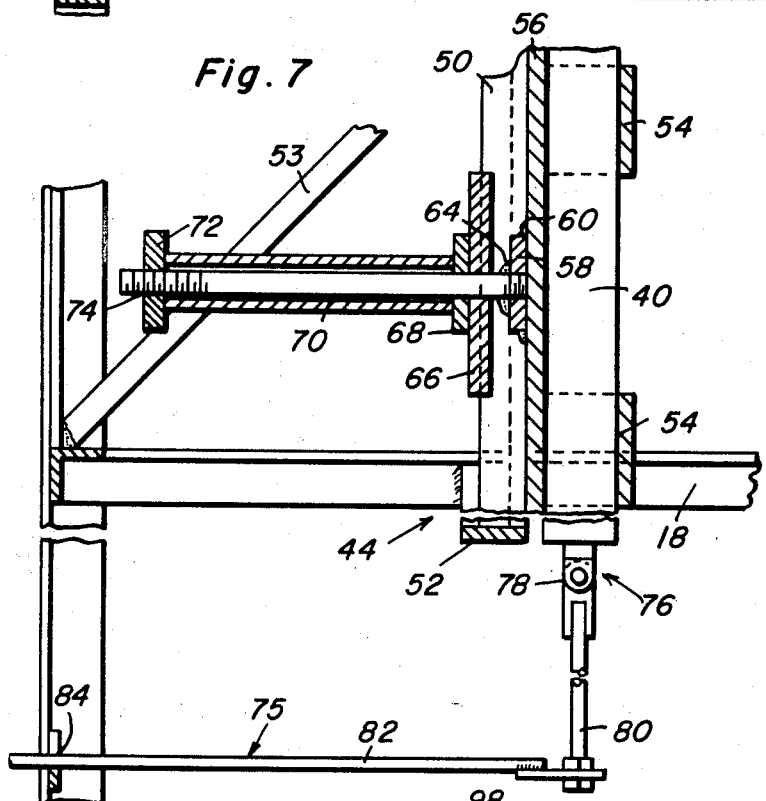
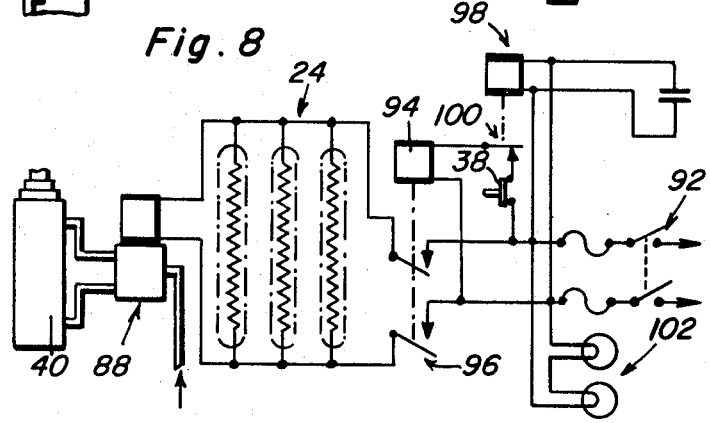
Joseph G. Maga
INVENTOR.

United States Patent Office 3,517,160
Patented June 23, 1970

3,517,160
ADHESIVE ACTIVATING MACHINE FOR SHOES
Joseph G. Maga, 62 Oak Ave., Athol, Mass. 01331
Filed Sept. 6, 1968, Ser. No. 768,586
Int. Cl. A43d 25/04; H05b 1/00
U.S. Cl. 219—215
9 Claims

ABSTRACT OF THE DISCLOSURE

A machine for heating and activating the adhesive applied to soles of shoes with an infra-red heat source so that the soles are not completely heated through when exposed to the heating source. The machine is automatic in bringing the soles into proximity of the infra-red heat source and energizing the same for a specific period of time and then removing the soles from such proximity for application to the shoe bottom.

This application is a refiling of U.S. Ser. No. 448,435, filed Apr. 15, 1965, now abandoned.

This invention relates to apparatus for use in the manufacture of footwear, and more particularly to an apparatus for activating adhesives previously applied to both shoe bottoms and shoe soles to prepare them for attachment.

In manufacturing shoes it has been the practice to apply cement to both shoe bottoms and shoe soles, then allowing the cement to dry for hours or days. When the sole is to be attached to the shoe, the dry cement must be activated. In the past, calrod heaters or similar resistance element type heaters have been used, requiring 30–40 seconds for activation of the cement.

It is therefore an object of this invention to provide apparatus for activating adhesives on shoe soles which require only 10–14 seconds for activation.

A further object of the present invention is to provide an apparatus for activating adhesives on shoe soles which utilizes radiant, infra-red energy thereby operating rapidly and efficiently in providing a better bond between shoe bottom and shoe sole.

A still further object of the present invention is to provide an apparatus for activating adhesives on shoe soles which utilizes radiant, infra-red energy thereby operating rapidly and preventing the shoe soles from being heated throughout thereby obviating poor quality soles and preventing an outline of the shoe bottom from appearing on the sole bottom.

It is a further object of the present invention to provide a device for activating adhesives on shoe soles and at the same time activating adhesives on shoe bottoms.

Another object of the present invention is to provide apparatus, having an electric heater for activating cement on shoe bottoms and shoe soles, including means for varying the degree of heat applied while at the same time insuring that every sole receives heat for the same time interval.

In accordance with the above object, it is a further object of the present invention to provide apparatus for activating cement and shoe soles in which the heater may be operated at full power at all times, the heat applied to the shoe soles being variable by adjustment of the carriage which carries the soles.

A further object of the present invention is to provide apparatus for activating cement on shoe soles including a time delay relay circuit to control the time for heating such soles.

These together with other objects and advantages which will become subsequently apparatus reside in the details of construction and operation as more fully hereinafter described and claimed, reference being had to the accompanying drawings forming a part hereof, wherein like numerals refer to like parts throughout, and in which:

FIG. 1 is a top plan view of the machine in accordance with the present invention.

FIG. 2 is a side elevational view of the machine.

FIG. 3 is a front elevational view of the machine.

FIG. 4 is an enlarged sectional view taken substantially along the plane of the line 4—4 of FIG. 3.

FIG. 5 is a sectional view partially broken away taken substantially along the plane of the line 5—5 of FIG. 4.

FIG. 6 is an enlarged sectional view taken substantially along the plane of the line 6—6 of FIG. 5.

FIG. 7 is a sectional view taken substantially along the plane of the line 7—7 of FIG. 6.

FIG. 8 is a schematic diagram of the electrical circuit associated with the machine of the present invention.

Referring now to FIGS. 1–3 in the drawings, reference numeral 10 refers to the adhesive activating machine of the present invention. The machine 10 includes a frame or body 12 having an upper compartment 14 and lower compartment 16. Cross members 18 are fixed between upstanding members 18a to provide rigidity in the construction of the body 12. Included within body 12, and extending into both the upper and lower compartments, is the inner frame or guide 20 which is fixedly attached in a conventional manner to the cross members 18. Mounted on the frame 12, as best illustrated in FIG. 3, is a panel box 22 which contains the electrical circuitry used in the present invention.

In the extreme upper portion of the upper compartment 14 are mounted quartz lamps 24 as shown in FIGS. 4 and 5 which comprise the heating unit of the present invention. The quartz lamps 24 are well known to those skilled in the art, and radiate substantially only infra-red rays. Lamps 24 are mounted in a porcelain block 26, as in the slots 28, for purposes of insulation. The blocks 26 are suspended by hangers 29 from the cross frame members 31 at the top of the body 12. Covering the top of the machine and enclosing upper compartment 14 is a louvered top 30, the purposes of which will be described hereinafter.

The carriage 32, illustrated for example in FIGS. 2 through 5, is mounted within inner frame member 20 so as to be vertically slidable therein. Carriage 32 is composed of heel receiving portion 34 and sole receiving portion 36. A micro switch 38 is mounted in carriage 32 and, as illustrated in FIG. 4, will be actuated by placement of a shoe sole upon the carriage.

An air actuated piston cylinder 40, containing piston rod 42 is mounted, as at 44 in lower compartment 16. Piston rod 42 is attached to the bottom of carriage 32, and upon actuation will move carriage 32 from a first position shown by solid line in FIG. 5 to a second position shown by dotted line within upper compartment 16.

The mounting of air cylinder 40 is explained by reference to FIG. 7. Upstanding guide members 50 are fixed to the body by top support member 53, cross members 18 and U-member 52 providing a longitudinal slot 51 therebetween. The cylinder 40 is clamped as by means of clamps 54 to a plate 56 which fits against guide members 50. Plate 56 has an internally threaded nut 58 secured to it as for example by weld 60, the nut 58 being disposed between the guide members 50 in slot 51. An externally threaded rod 62 is threaded into nut 58 and secured thereto as for example by welds 64. The rod 62 fits between runners 50 and extends therethrough. A second plate 66 fits over rod 62 and against the side of the guide members 50 opposite of plate 56. A washer 68 fits over the rod 62 and bears against the plate 66. A hollow spacer 70 fits over rod 62 and bears against washer 68. The assembly of plate 66, washer 68 and spacer 70 are held in place by knurled nut 72 which is threaded on rod 62 as by thread 74. It is apparent therefore that the nut 72 when tightened down holds plate 66, plate 56, clamps 54 and piston cylinder 40 tightly in place against runner members 50.

It will be further readily apparent from FIGS. 2, 3 and 7 that when cylinder 40 is loosened for vertical adjustment, manual displacement is facilitated by means of cylinder adjuster 75 which is attached to cylinder 40 at 76 by hinge 78. The adjuster 75 has a vertical portion 80 and a horizontal portion 82. The horizontal portion 82 extends through a slot 84 in cross member 18 and terminates in a handle 86. It is readily apparent in viewing FIG. 2, that downward movement of handle 86 will move the cylinder 40 upwardly. This will therefore also upwardly shift carriage 32. Also associated operatively with the cylinder 40 in an air solenoid valve 88 conveniently mounted on panel box 22 and a pressure indicator 90 mounted on the frame in order to be readily viewable.

As shown in FIG. 3, the compartment 14 is enclosed by thermally non-conductive walls 89 so as to form a barrier against the loss of heat during the adhesive activating interval. When a sole is carried into the compartment 14 by carriage 32 and the quartz lamps 24 are energized. The adhesive on the sole is promptly activated by direct radiations from the lamps 24 and the rapid heating of the compartment. Heated air from the compartment is also directed upwardly through the openings 104 between the louvers 106 for heating the adhesive coated bottom of the shoe upper placed thereon. The louver elements also downwardly reflect radiation from the lamps for said rapid heating of the compartment.

Reference is now made to FIG. 8 to describe the electrical operation of the invention. Micro switch 38, previously described, is normally maintained open. On-off switch 92 may be closed to place the machine in condition for operation. When both switches 38 and 92 are closed electrical energy will activate magnetic relay 94 thereby causing it to close relay switches 96 which in turn allows electrical energy to flow to the lamps 24 and the air solenoid valve 88. It is apparent that this causes the lamps 24 to radiate infra-red rays and air under pressure to flow to air cylinder 40 thereby causing piston rod 42 to extend from the cylinder carrying carriage 32 to the upper compartment 14 adjacent lamps 24. Closing microswitch 38 and on-off switch 92 also causes electrical energy to flow to delay relay 98, which after elapse of a predetermined time interval opens normally closed relay switch 100. Opening of switch 100 causes relay 94 to be deenergized thereby causing switches 96 to open and cut off the flow of electrical energy to lamps 24 and valve 88. Quite apparently, at this time the lamps will cease radiating and the piston rod and carriage will return to the lower compartment 16. The above describes operation of the present invention. It will be noted that when switch 92 is closed pilot lights 102 are energized thereby indicating an "On" condition of the machine.

It can be appreciated, by reference to FIG. 2, that the present invention provides for automatic adhesive activation of a shoe sole, while at the same time allowing for heat activation of the adhesive on the shoe upper by placement thereof on the louvered top. The spaces 104 between adjacent louvers 106 allow the heating effects of the lamps 24 to transverse upwardly to the shoe upper, while the louvers 106 provide a reflecting surface to the rays.

The delay interval of the relay 98 is adjusted as to include the time it takes the carriage 32 to complete its upward stroke and the adhesive activating period. Also, in order to vary the exposure of the sole to the radiations from the lamps, the upper limit of the carriage stroke is adjustable by the cylinder mounting facilities described. It should also be appreciated that two machines 10 could be simultaneously operated, operatively interrelated however so that while one machine is being loaded with its carriage in the lower position, the carriage of the other machine is in its upper position exposing a sole to the lamp radiations.

What is claimed as new is as follows:

1. A machine for treating the soles of shoes with heat comprising a body frame including an upper compartment and a lower zone, heating means for providing substantially only infra-red radiant heat rays in said upper compartment, a carriage slidably mounted in said body frame and selectively movable from said lower zone to said upper compartment, a piston cylinder movably mounted within said body frame below said carriage, a piston rod carried by said cylinder connected to the underside of said carriage, and control means regulating the heating time of said shoe soles, said control means operatively connected to said heating means and said piston cylinder.

2. The machine of claim 1 wherein said heating means comprises a plurality of quartz lamps positioned to radiatingly transfer infra-red heat to said soles upon actuation by said control means.

3. The machine of claim 2 further including an air solenoid valve for selectively applying air pressure to said cylinder whereby said piston rod is forced out of the cylinder thereby moving said carriage within said body, said cylinder being slidably mounted for adjustment within said body whereby the extension of said piston rod and carriage into said upper compartment is adjustable.

4. The machine of claim 3 wherein said cylinder mounting means includes a plate fixedly mounted to said body, means for selectively clamping said cylinder to said plate, a cylinder adjuster rod attached to said cylinder and extending outwardly of said body whereby upon being unclamped said cylinder may be adjusted in position.

5. The machine of claim 1 wherein said control means includes a power source, a micro switch mounted on said carriage for response to placement of a sole on said carriage, circuit means operatively connecting said switch to said heating means and said moving means whereby upon closing of said switch said heating means and said moving means are electrically actuated by the power source, and time delay relay means operatively connected to said switch for opening of said circuit after a predetermined time interval.

6. The machine of claim 1 wherein the upper compartment is provided with a louvered top immediately adjacent the heating means.

7. In a machine for activating adhesive on a sole and the bottom of a shoe, an insulated chamber having an opening, a carriage adapted to support an adhesive coated sole thereon, a plurality of quartz lamps mounted within said chamber below the opening, time controlled means for energizing said lamps for a predetermined activating interval while the carriage is in the chamber, louver means closing said opening of the chamber above the lamps to reflect downwardly the radiations from the lamps and to direct upwardly air heated within the chamber, and means responsive to placement of the sole on the carriage for upwardly displacing the carriage to a predetermined position within the chamber below the lamps.

8. A machine for treating the soles of shoes comprising a frame, activating chamber means supported by the frame, radiant heating means mounted within the chamber means, a carriage movably mounted by said frame, power operated means connected to the carriage for vertical movement thereof into and out of the chamber means and control means operatively connected to the heating means and the power operated means for regulating the length of time during which the carriage is held within the chamber means to thereby activate adhesive coating a sole positioned on the carriage.

9. In a machine for activating adhesive on a sole and the bottom of a shoe, an insulated chamber, a carriage adapted to support an adhesive coated sole thereon, radiation emitting means mounted within said chamber, time controlled means for energizing the radiation emitting means for a predetermined activating interval while the carriage is in the chamber, louver means mounted on the chamber above the radiation emitting means for upwardly directing air heated within the chamber by radiation and downwardly reflecting radiation from the radiation emitting means, and means responsive to placement of the sole on the carriage for upwardly displacing the carriage to a predetermined position within the chamber below the radiation emitting means.

References Cited

UNITED STATES PATENTS

| | | | |
|---|---|---|---|
| 2,582,464 | 1/1952 | Small | 219—215 X |
| 2,694,131 | 11/1954 | Carson | 219—215 |
| 2,720,864 | 10/1955 | Smith | 92—161 X |
| 2,779,856 | 1/1957 | Fahner | 219—518 X |
| 2,869,856 | 1/1959 | Greene | 263—6 X |
| 3,256,420 | 6/1966 | Werman | 219—215 |
| 3,256,421 | 6/1966 | Card | 219—215 |

JOSEPH V. TRUHE, Primary Examiner

P. W. GOWDEY, Assistant Examiner

U.S. Cl. X.R.

219—201, 354, 518